J. B. DAVIS.
SCALE INDICATOR FOR DISPENSING PUMPS.
APPLICATION FILED SEPT. 26, 1917.
1,275,868.
Patented Aug. 13, 1918.
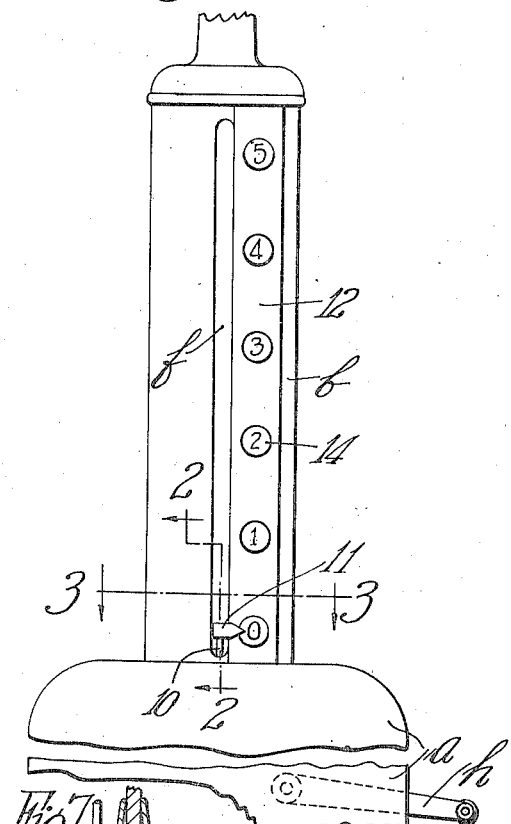
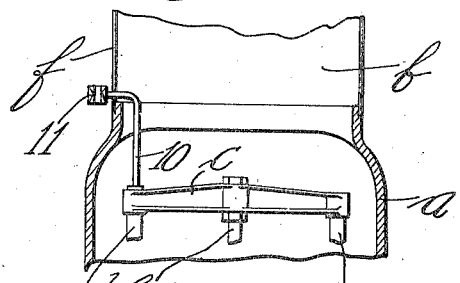
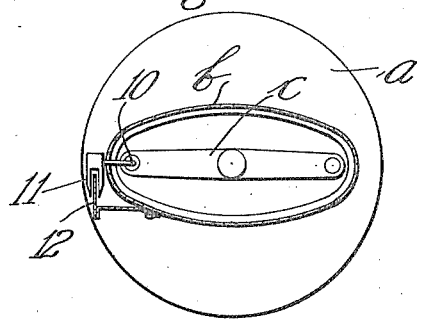
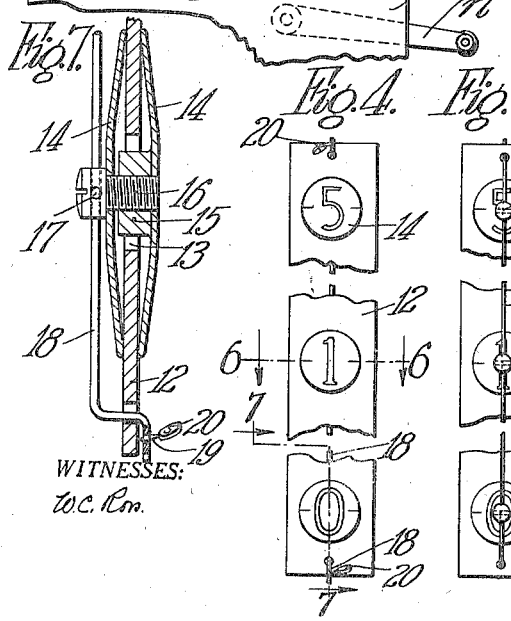
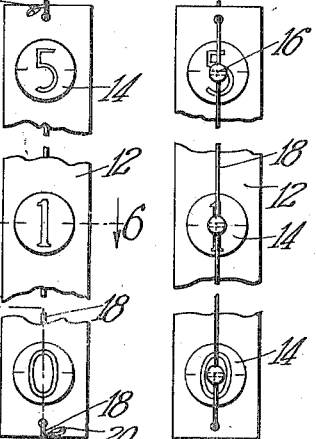
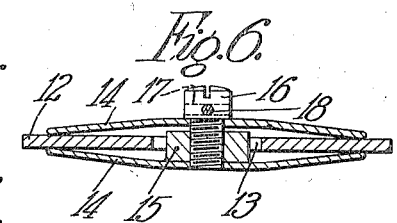
WITNESSES:
W. C. Rm.
INVENTOR.
John B. Davis.
BY Chapin + Neal.
ATTORNEYS.

UNITED STATES PATENT OFFICE.

JOHN B. DAVIS, OF SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS.

SCALE-INDICATOR FOR DISPENSING-PUMPS.

1,275,868.  Specification of Letters Patent.  Patented Aug. 13, 1918.

Application filed September 26, 1917. Serial No. 193,269.

*To all whom it may concern:*

Be it known that I, JOHN B. DAVIS, a citizen of the United States, and a resident of Springfield, in the county of Hampden and State of Massachusetts, have invented certain new and useful Improvements in Scale-Indicators for Dispensing-Pumps, of which the following is a specification.

This invention relates to indicating scales, particularly intended for use with measuring or dispensing pumps, to indicate various stages of the displacement of the pump.

It is well known that the measuring pump, when originally set up, is adjusted, as by limiting its stroke, until a definite accurately measured unit quantity of fluid is delivered on each stroke. It is also known that for various reasons, as wear in the pump parts, the stroke of the pump may require adjustment from time to time to maintain the quantities discharged on each stroke at the desired unit value. Such adjustments may, for example, be made from time to time by the sealer of weights and measures. It is now common to provide, for the convenience of customers, a scale suitably graduated as in fractional parts of the said unit quantity, which scale is traversed by a pointer movable with the pump-actuating mechanism. It follows that, when the scale plate is permanently graduated, any variation in the stroke of the pump, which may be made to secure the delivery of the accurately measured unit quantity, will destroy the accuracy of the scale as an indicating means.

This invention has for an object to provide an indicating scale for the purpose described, wherein the scale graduations are applied to members which are adjustably mounted on the scale plate, whereby the graduations may be shifted on the plate as made necessary by adjustments in the stroke of the pump, so that the scale pointer, which moves proportionately to the stroke of the pump, may accurately indicate by co-operation with the scale the quantities dispensed.

Another object of the invention is to provide an indicating scale for the purpose described which involves a scale plate, supported so that both its faces are visible and provided with a series of apertures arranged approximately at the points where graduations are required, and a pair of graduation bearing disks for each aperture, the disks of each pair being arranged on opposite faces of said plate to cover an aperture, together with a means for clamping the pairs of disks to the plate, each clamping means being smaller than its aperture to provide for relative movement of the disks on the scale plate.

Another object of the invention is to provide in an indicating scale of the type described, a single device which may be readily sealed to the scale plate, to prevent movement of the several disk clamping means.

A further object of the invention is to provide a specifically improved and simplified construction of the disks and the clamping means therefor.

Other objects and advantages will appear in the following description and in the appended claims.

The invention, in an embodiment at present preferred, is disclosed for purposes of illustration in the accompanying drawings, in which—

Figure 1 is a fragmentary front elevational view of a dispensing pump showing the invention as applied thereto;

Fig. 2 is a partial cross-sectional view taken on the line 2—2 of Fig. 1;

Fig. 3 is a sectional plan view taken on the line 3—3 of Fig. 1;

Figs. 4 and 5 are enlarged front and rear elevational views of the indicating scale shown in Fig. 1;

Fig. 6 is an enlarged cross-sectional view taken on the line 6—6 of Fig. 4; and

Fig. 7 is an enlarged fragmentary sectional elevation taken on the line 7—7 of Fig. 4.

Referring to these drawings, there is illustrated in Figs. 1, 2, and 3, in fragmentary form, such parts of an inclosed dispensing pump as are necessary to an understanding of the invention. For the purpose of convenient reference, the pump parts have been given the form and arrangement of the pump disclosed in my copending application Serial No. 152,642, filed March 6, 1917. Briefly stated, the pump comprises a lower and generally cylindrical casing *a*, and upper casing $b$ of substantially elliptical cross-section, and suitable pumping mechanism (not shown) which is housed entirely within casing $a$, save for a reciprocable cross-head $c$, suitable rods $d$ to operate the cross-head, and a piston rod $e$ movable by the latter. The cross-head $c$ and connected parts are, however, completely inclosed and are movable vertically up and down within the hollow elliptical casing $b$. For a more complete disclosure of the pump with which the invention may be used, reference is made to the above-mentioned application.

As pointed out in said application, all the pump mechanism is entirely and effectively inclosed except for a necessary pump-operating handle $h$ and a part on the pump which extends outside the casing to cooperate with parts on the latter, whereby the displacement of the pumps may be indicated at all times. This part on the pump comprises a right-angularly bent rod 10 fixed to cross-head $c$ and extending through a vertical slot $f$ in casing $b$. The rod 10 carries a forked pointer 11 (Figs. 2 and 3) which is constructed to traverse both the front and rear faces of an indicating scale 12, and the latter is suitably fixed or permanently fastened to casing $b$, as indicated in Fig. 3. The front and rear faces of scale 12 are conveniently visible to the customer and operator, respectively.

The scale 12 is not directly graduated to indicate the displacement of the pump, but the graduations are applied to both sides of the scale by disks which are adjustably mounted in the plate, as will now be described with particular reference to Figs. 4 to 7, inclusive. Scale 12 has a series of vertically-spaced circular holes 13 therein, the centers of which are spaced from one another by approximately the distance desired between the scale graduations. In the embodiment of the invention illustrated, six holes are provided, the centers of which indicate approximately the vertical position necessary for pointer 11 to assume to cause the delivery of one, two, three, four, and five gallon quantities, the sixth opening indicating the "zero" position of the pointer. The desired graduations and designations are applied to circular buttons or disks 14, as clearly shown in Figs. 4 and 5. For each hole 13, two disks are used, one on each side of the scale 12, as shown in Figs. 6 and 7.

The mounting of each pair of disks 14 is similar, and the following description of one will be illustrative of all. Referring to Figs. 6 and 7, one disk of each pair, preferably that on the front face of scale 12, has an interiorly-threaded boss 15 secured to its inner face. For convenience in manufacture, this boss 15 may consist of a standard nut, which may be secured to the disk, as by soldering, for example. The other disk 14 of each pair, preferably that on the rear face of scale 12, has a central hole to receive a screw 16, which may advantageously consist of a standard fillister head screw, for example, and is threaded into boss 15 so that the pair of disks 14 may be drawn together and clamped to scale 12. The screw 16 requires only the drilling of one or more lateral holes 17 through the head, in the illustrated embodiment two holes the axes of which are located in a common plane and intersect at right angles.

It is to be noted that the boss or nut 15 is relatively small in comparison with the hole 13 and that it may, therefore, be moved above or below the center of the opening, whereby there is provided a latitude for vertical adjustment of the disks 14 on scale 12. Thus, when the pump is tested, the disks 14 may be moved up or down on the scale 12 until the graduations on the disks exactly aline with the pointer 11 when the respective measured quantities indicated by the marks on the disks have been delivered by the pump. It is to be understood that in making the above described adjustments of disks 14, the screws 16 are tightened just sufficiently to hold the disks to the scale 12. The disks may then be moved the small distances required by lightly tapping them in the appropriate direction. The disks 14, once adjusted, are then clamped to scale 12 against subsequent displacement by turning up the screws 16, as tightly as possible.

In order to prevent the disks from being moved from their adjusted position, it is essential that the screws 16 be "sealed" so that they cannot be turned without breaking the seal. Instead of independently "sealing" each disk to scale 12, a single wire 18 is provided which may be passed vertically through one of the holes 17 in each screw 16, as shown in Figs. 5 and 7, and preferably the wire 18 is applied on the rear face of scale 12. In this connection, it is to be noted that the disks 14 are made slightly concave in cross-sectional shape and preferably of spring metal. The practical utility of this construction is that the screws 16 may be turned through a considerable angle even after the disks have been tightly clamped to the scale 12, whereby one of the two holes 17 in each screw may be moved into vertical alinement so that the wire 18 may be passed vertically through all the screws, as shown in Fig. 5. The upper and lower ends of wire 18 are then passed forwardly through openings in the top and bottom of scale 12 and thereafter bent over as best shown in Fig. 7. The wire 18 is provided adjacent its ends with small apertures through which small sealing wires 19 may be looped and, when the ends of wires 19 have been held by a seal 20, it will be apparent that the wire 18 cannot be removed, without detection of the fact, and unless the wire 18 is removed the screws 16 cannot be turned to loosen disks 14 sufficiently so that they can be moved relatively to the scale.

It will thus be seen that I have provided an improved scale for use with pumping mechanism, wherein the graduations may be moved relatively to the scale plate, as made necessary by alteration of the stroke of the pump and wherein the several graduation bearing members may be effectively held against movement relatively to the scale plate. It is recognized that modifications may be made in the one embodiment of the invention herein disclosed for illustrative purposes without departing from the scope of the invention which is defined by the appended claims rather than by the foregoing description.

What I claim is—

1. An indicating scale, comprising, a suitable supporting member, a plurality of disks each provided with means to indicate a scale graduation, means to independently clamp the disks to said member in various positions of adjustment, and a sealable device to hold said several means to said member.

2. An indicating scale, comprising, a scale plate having a plurality of spaced holes therethrough located substantially at the points where graduations are required, a plurality of pairs of disks, at least one disk of each pair provided with means to indicate a scale graduation, each pair arranged to be applied to opposite faces of said plate to cover a hole, an interiorly-threaded member on one disk of each pair, and a screw passing through the other disk of each pair into said threaded member, whereby each pair of disks may be clamped to the scale plate, said members being smaller than the holes, whereby the disks may be moved relatively to the scale plate.

3. An indicating scale, comprising, a scale plate having a plurality of spaced holes therethrough located substantially at the points where graduations are required, a plurality of pairs of dish-shaped disks of spring material, at least one disk of each pair provided with means to indicate a scale graduation, each pair arranged to be applied to opposite faces of said plate to cover a hole, an interiorly-threaded member on one disk of each pair, and a screw passing through the other disk of each pair into said threaded member, whereby each pair of disks may be clamped to the scale plate, said members being smaller than the holes, whereby the disks may be moved relatively to the scale plate, a transverse hole provided in each screw, and a wire extending through all the last-named holes and adapted to be sealed to the scale plate.

4. An indicating scale, comprising, a suitable scale plate, a plurality of devices each provided with means to indicate a scale graduation for said plate, rotatable means to independently clamp each device to said plate in various positions of adjustment, an aperture in each clamping means arranged substantially parallel to said plate, said devices being constructed and arranged to permit said means to be turned within limits after the devices have been clamped to the plate to permit all the apertures to be brought into alinement, and a member extending through all said alined apertures to hold each clamping means against movement, said member being arranged to be sealed to said plate.

JOHN B. DAVIS.